(12) United States Patent
Kitayama et al.

(10) Patent No.: US 7,238,769 B2
(45) Date of Patent: Jul. 3, 2007

(54) METHOD FOR JOINING LIQUID-CRYSTALLINE POLYESTER RESIN COMPOSITION PARTS AND JOINTED ARTICLE MADE OF LIQUID-CRYSTALLINE POLYESTER RESIN COMPOSITION

(75) Inventors: Masaya Kitayama, Takarazuka (JP); Naoshi Saito, Itami (JP)

(73) Assignee: Kabushiki Kaisha Ueno Seiyaku Oyo Kenkyujo, Osaka-fu (JP)

( * ) Notice: Subject to any disclaimer, the term of this patent is extended or adjusted under 35 U.S.C. 154(b) by 92 days.

(21) Appl. No.: 11/125,240

(22) Filed: May 10, 2005

(65) Prior Publication Data

US 2005/0256289 A1    Nov. 17, 2005

(30) Foreign Application Priority Data

May 11, 2004    (JP)    ............................. 2004-141180

(51) Int. Cl.
*C08G 63/00*    (2006.01)

(52) U.S. Cl. .................. 528/176; 156/64; 156/73.1; 156/73.2; 156/73.5; 156/308.2; 528/190; 528/193

(58) Field of Classification Search .................. 156/64, 156/73.1, 73.2, 73.5, 308.2; 524/449, 451; 528/176, 190, 193
See application file for complete search history.

(56) References Cited

U.S. PATENT DOCUMENTS

| 3,562,041 A | | 2/1971 | Robertson |
|---|---|---|---|
| 4,219,461 A | | 8/1980 | Calundann |
| 5,179,192 A | | 1/1993 | Kanaka et al. |
| 5,643,988 A | * | 7/1997 | Nakamura et al. .......... 524/449 |
| 5,658,408 A | * | 8/1997 | Frantz et al. .................. 156/64 |

FOREIGN PATENT DOCUMENTS

| DE | 103 00 215 A1 | | 7/2004 |
|---|---|---|---|
| EP | 1 033 315 A1 | | 9/2000 |
| GB | 1 314 572 | | 4/1973 |
| GB | 2 047 725 A | | 12/1980 |
| GB | 2 167 513 A | | 5/1986 |
| GB | 2 167 514 A | | 5/1986 |
| JP | 55-144024 A | | 11/1980 |
| JP | 6-329775 A | | 11/1994 |
| JP | 7-207011 A | | 8/1995 |
| JP | 2000233448 | * | 8/2000 |

OTHER PUBLICATIONS

European Search Report dated Aug. 25, 2005; 15462EP/cf.
Austrian Patent Office Search Report; Date of Mailing Apr. 7, 2006; Application No. 200503161-2; Filing Date May 11, 2005.

* cited by examiner

*Primary Examiner*—Terressa Boykin
(74) *Attorney, Agent, or Firm*—Sughrue Mion, PLLC

(57) ABSTRACT

The present invention provides a method for joining liquid-crystalline polyester resin composition parts, characterized in that the melting point of the liquid crystalline polyester resin measured by differential scanning calorimeter is 190-250° C. and that the parts are jointed by means of welding. By using the method of the present invention, jointed articles with sufficient joint strength are provided with accuracy.

22 Claims, 2 Drawing Sheets

METHOD FOR JOINING LIQUID-CRYSTALLINE POLYESTER RESIN COMPOSITION PARTS AND JOINTED ARTICLE MADE OF LIQUID-CRYSTALLINE POLYESTER RESIN COMPOSITION

TECHNICAL FIELD

The present invention relates to a method for joining liquid-crystalline polyester resin composition parts and a jointed article made of liquid-crystalline polyester resin composition obtained by the joining method.

BACKGROUND ART

Thermotropic liquid-crystalline polyester resin (hereinafter, called as "liquid-crystalline polyester resin" or "LCP") is exhibits good flowability on molding and excellent thermostability, and therefore, widely used for manufacturing molded articles, especially, electronic components having thin and small parts such as fine pitch connector. LCP also has good mechanical properties including good rigidity as well as excellent chemical resistant, and gas barrier properties and exhibits high dimensional accuracy. Due to those properties, LCPs are used not only for manufacturing molded articles but also for a variety of products including fibers and films.

Recently, secondary fabrication of molded articles, fibers or films made of LCP is attracting attention of the art. Among the conventionally known secondary fabrication methods, joining methods such as bonding and welding have gotten a lot of attention. In particular, a method widely used for fabricating multipurpose plastics, i.e. methods for welding resin parts, which utilizes frictional heat, have been expected as candidate for fabricating liquid-crystalline polyester resin parts.

However, the widely-distributed conventional liquid-crystalline polyester resins have extremely high melting point as high as 280-400° C. and therefore, LCPs might not be welded by the conventional welding method, or even if they could, the joint portion of the obtained welded product might be too weak to be practically used. Some improved methods for welding liquid-crystalline polyester resin parts have been proposed. For example, JP A H03-184830 discloses an improved method for ultrasonic welding of resin with high melting point such as liquid-crystalline polyester resin, which comprises preliminarily heating the resin to a certain range of temperatures and then, welding the resin. This method can assure the joining in the ultrasonic welding technique.

Specifically, in the method, resin parts to be jointed such as LCP with melting point of higher than 250° C. are preheated by means of an external heating equipment such as air-oven or by heating the support which can be heated by means of heating medium or a heating device and thereafter, ultrasonic welding is carried out. Said method can assure the welding and decrease deformation or failure of the molded articles to be welded.

However, the method is not satisfactory in view of cost and efficiency because of the additional pre-heating step which requires an external heating device or internal support heating equipment. Moreover, the method is not practical because of softening or deformation of the welded articles due to high pre-heating temperatures.

SUMMARY OF INVENTION

An object of the present invention is to provide a method for joining liquid-crystalline polyester resin composition parts which ensure accuracy of the joint and can provide a jointed article with excellent joint strength. Another object of the present invention is to provide a jointed article made of LCP wherein two or more parts made of LCP are strongly jointed by the method of the invention.

The present invention provides a method for joining liquid-crystalline polyester resin composition parts, characterized in that the melting point of the liquid crystalline polyester resin, which is contained in the composition, measured by the differential scanning calorimeter is 190-250° C. and that the parts are jointed by means of welding.

The present invention also provides a jointed article of liquid-crystalline polyester resin composition obtainable by said joining method.

"Jointed article made of liquid-crystalline polyester resin composition" used herein refers to a product made of liquid crystalline polyester resin composition and has jointed portion formed by the method of the present invention.

"Liquid-crystalline polyester resin composition" used in the present invention may comprise fillers and/or reinforcements in an amount of 0-100 parts by weight per 100 parts by weight of the liquid-crystalline polyester resin.

According to the present method, a jointed article made of liquid-crystalline polyester resin composition with good accuracy and high joint strength can be provided.

DETAILED DESCRIPTION OF THE INVENTION

Figure 1:
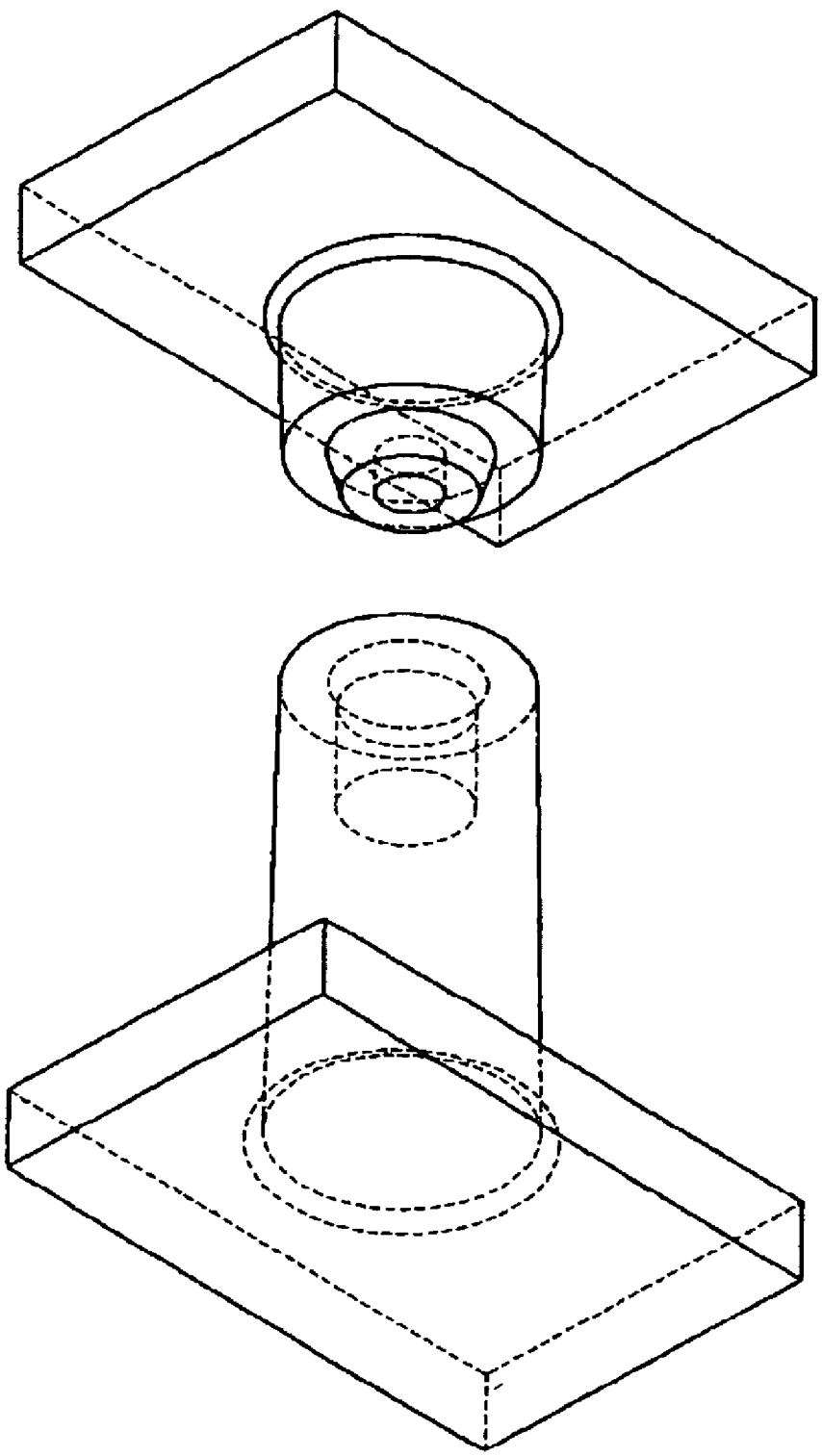
FIG. 1 depicts the scarf joint used in Examples.

The liquid-crystalline polyester resin contained in the liquid-crystalline polyester resin composition used in the present invention is not specifically limited and may be any polyester resin which has melting point measured by differential scanning calorimeter of 190-250° C., exhibits anisotropic melt phase and is called as thermotropic liquid-crystalline polyester resin by those skilled in the art.

The anisotropic melt phase can be confirmed by means of conventional polarized light system using orthogonal light polarizer. In more detail, the sample on the Leitz's hot stage under nitrogen atmosphere may be observed with Leitz's polarization microscope.

A liquid-crystalline polyester resin whose melting point determined by differential scanning calorimeter is equal to or above 190° C. and below 250° C. used in the present invention may be semi-aromatic liquid-crystalline polyester resin or wholly aromatic liquid-crystalline polyester resin. In the present specification and claims, "semi-aromatic liquid crystalline polyester resin" represents a aliphatic-aromatic LCP which has aliphatic moieties in the molecular chain. Wholly aromatic liquid-crystalline polyester resin represents a LCP in which each recurring monomeric unit contributes at least one aromatic nucleus to the polymer backbone.

Among those liquid-crystalline polyester resins, wholly aromatic liquid-crystalline polyester resins are preferable because of their flame retardancy and good mechanical properties.

Examples of repeating units used for preparing liquid-crystalline polyester resins used in the present invention are aromatic oxycarbonyl repeating units, aromatic di-carbonyl repeating units, aromatic dioxy repeating units, aromatic oxy di-carbonyl repeating units and aliphatic dioxy repeating units.

The liquid-crystalline polyester resin composed of the above described repeating units may include both of those give anisotropic melt phase and those do not, depending on structural component or the resin and the ratio thereof, and sequence distribution. The liquid-crystalline polyester resins used in the present invention are limited to those exhibit anisotropic melt phase.

Examples of monomers which provide the aromatic oxycarbonyl repeating units are p-hydroxybenzoic acid, m-hydroxybenzoic acid, o-hydroxybenzoic acid, 6-hydroxy-2-naphthoic acid, 5-hydroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid, and alkyl-, alkoxy- or halogen-substituted derivatives thereof as well as ester forming derivatives such as acyl derivatives, ester derivatives and acyl halide thereof. Among the above, para-hydroxybenzoic acid and 6-hydroxy-2-naphthoic acid are preferable in terms of controlling the properties and the melting point of the resulting liquid-crystalline polyester resin.

Examples of monomers which provide the aromatic di-carbonyl repeating units are aromatic dicarboxylic acids such as terephthalic acid, isophthalic acid, 2,6-naphthalene dicarboxylic acid, 1,6-naphthalene dicarboxylic acid, 2,7-naphthalene dicarboxylic acid, 1,4-naphthalene dicarboxylic acid, 4,4'-dicarboxybiphenyl, bis(4-carboxyphenyl)ether, bis(3-carboxyphenyl)ether, and alkyl-, alkoxy or halogen-substituted derivatives thereof as well as ester forming derivatives such as ester derivatives, acid halide thereof. Among the above, terephthalic acid and 2,6-naphthalene dicarboxylic acid are preferable in terms of controlling mechanical properties, heat resistance, melting point and molding properties of the resulting liquid-crystalline polyester resin.

Examples of monomers which provide the aromatic dioxy repeating units are aromatic diols such as hydroquinone, resorcin, 2,6-dihydroxynaphthalene, 2,7-dihydroxynaphthalene, 1,6-dihydroxynaphthalene, 1,4-dihydroxynaphthalene, 4,4'-dihydroxybiphenyl, 3,3'-dihydroxybiphenyl, 3,4'-dihydroxybiphenyl, 4,4'-dihydroxybiphenyl ether, and alkyl-, alkoxy- or halogen-substituted derivatives as well as ester forming derivatives such as acyl derivatives thereof. Among the above, hydroquinone and 4,4'-dihydroxybiphenyl are preferable in terms of the good reactivity during the polymerization process and the good properties of the resulting liquid-crystalline polyester resin.

Examples of monomers which provide the aromatic oxy di-carbonyl repeating units are hydroxy aromatic dicarboxylic acids such as 3-hydroxy-2,7-naphthalene dicarboxylic acid, 4-hydroxy-isophthalic acid, 5-hydroxy-isophthalic acid, and alkyl-, alkoxy- or halogen-substituted derivatives thereof as well as ester forming derivatives such as acyl derivatives, ester derivatives and acid halide thereof.

Examples of monomers which provide the aliphatic dioxy repeating units are aliphatic diols such as ethylene glycol, 1,4-butanediol, 1,6-hexanediol, and acyl derivatives thereof. In addition, liquid-crystalline polyester resins having an aliphatic dioxy repeating unit can be obtained by reacting polyesters having the aliphatic dioxy repeating unit such as polyethylene terephthalate or polybutylene terephthalate with the above aromatic oxycarboxylic acid, aromatic dicarboxylic acid, aromatic diol or acyl derivatives, ester derivatives or acid halide thereof.

Among the above, preferred liquid-crystalline polyester resin used in the present invention are those essentially consisting of the repeating units represented by the following formulae (I), (II), (III) and (IV) in view of their low melting points and good mechanical properties:

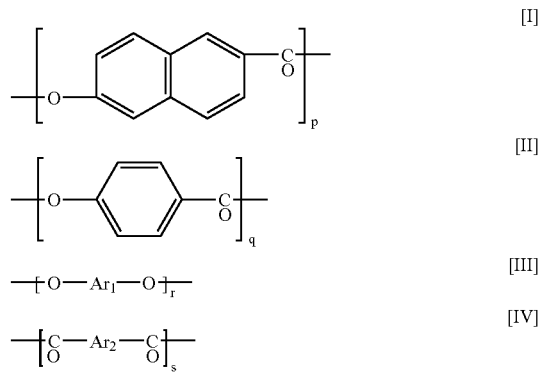

wherein:
$Ar_1$ and $Ar_2$ each represents at least one bivalent aromatic group; and
p, q, r and s represent relative molar proportions (mol %) of the repeating units in the liquid-crystalline polyester resin and satisfy the following formulae:

$0.4 \leq p/q \leq 2.0$ $2 \text{ mol \%} \leq r \leq 15 \text{ mol \%}$ $2 \text{ mol \%} \leq s \leq 15 \text{ mol \%}.$ Among the above, preferred combinations of repeating units are shown below.

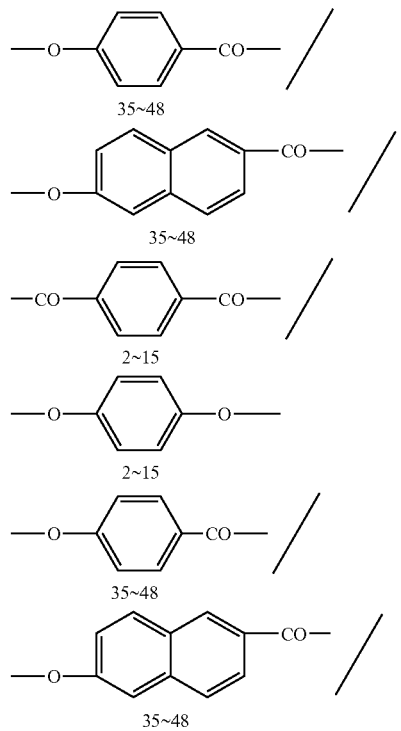

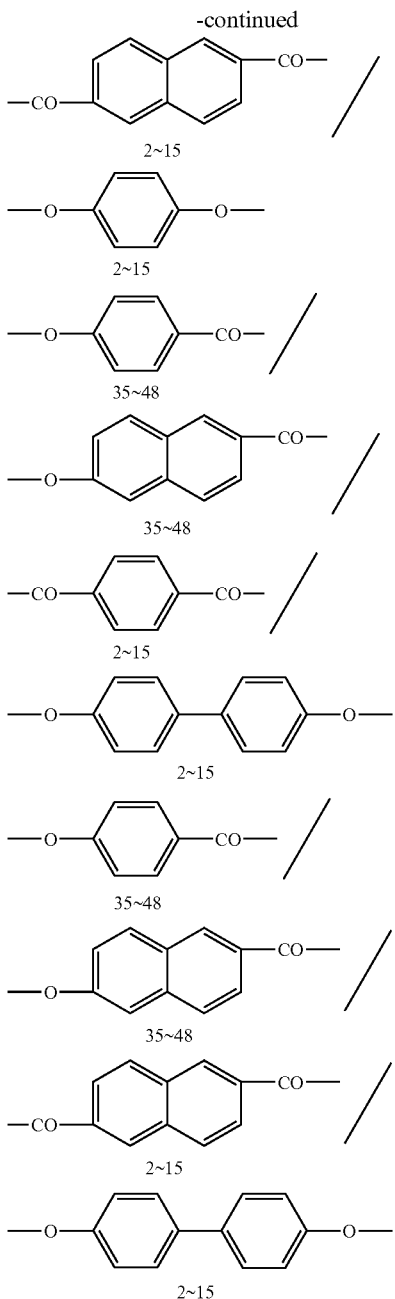

Among the above, an especially preferred combination of repeating units is as follows:

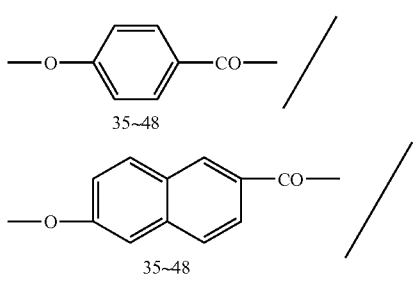

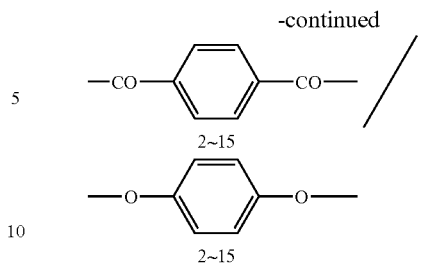

wherein: the value under the unit represents mol % amount of each repeating unit in the liquid-crystalline polyester resin.

The liquid-crystalline polyester resin used in the present invention may have amide bonding or thioester bonding unless the bonding does not impair the object of the present invention. Examples of monomers which provide amide bonding or thioester bonding are aromatic hydroxyamine, aromatic diamine, aromatic aminocarboxylic acid, mercapto-aromatic carboxylic acid, aromatic dithiol and mercapto-aromatic phenol. The proportion of these additional monomers based on the total amount of monomers which provide aromatic oxycarbonyl repeating unit, aromatic di-carbonyl repeating unit, aromatic dioxy repeating unit, aromatic oxy di-carbonyl repeating unit and aliphatic dioxy repeating unit is preferably no more than 10 mol %.

In addition, liquid-crystalline polyester resin used in the present invention may be those obtained by blending two or more liquid-crystalline polyester resins whose melting points determined by differential scanning calorimeter are within the range of 190-250° C.

The method for preparing the liquid-crystalline polyester resin used in the present invention is not limited and any method known to the art can be employed. For example, conventional polymerization method such as molten acidolysis and slurry polymerization methods for preparing polyester to give ester bonding among the above described monomer components may be employed.

The molten acidolysis method is preferably used for preparing the liquid-crystalline polyester resin used in the present invention. In this method, the monomers are heated to give molten solution and then the solution is reacted to give the molten polymer. The final step of this method may be carried out under vacuum to facilitate removal of the volatile by-products such as acetic acid or water.

The slurry polymerization method is characterized in that monomers are reacted in a heat-exchange fluid to give solid state polymer in the form of suspension in the heat-exchange liquid medium.

In either of the molten acidolysis method or the slurry polymerization method, the polymerizing monomer components may be in the denatured form, i.e. as lower acyl ester, which can be obtained by esterifying the hydroxyl group at room temperature. The lower acyl group may have preferably 2-5, more preferably 2-3 carbon atoms. Acetic esters are most preferably used for the reaction.

The lower acyl esters of the monomers may be those prepared beforehand by acylating the monomers independently or may be those produced in the reaction system by adding an acylating agent such as acetic anhydride to the monomers upon preparing the liquid-crystalline polyester.

In either of the molten acidolysis method or the slurry polymerization method, a catalyst may be used in the reaction, if desired.

Examples of the catalysts include organic tin compounds such as dialkyl tin oxide (ex. dibutyl tin oxide) and diaryl tin oxide; organic titanium compounds such as titanium dioxide, antimony trioxide, alkoxy titanium silicate and titanium alkoxide; alkaline or alkaline earth metal salt of carboxylic acid such as potassium acetate; salts of inorganic acid (ex. $K_2SO_4$) and gaseous acid catalysts such as Lewis acid (ex. $BF_3$) and halogenated hydrogen (ex. HCl)

When a catalyst is used, the amount of the catalyst added to the reaction based on the total monomers may preferably be 10-1000 ppm, and more preferably 20-200 ppm.

According to the present invention, the melting point of the liquid-crystalline polyester resin determined by differential scanning calorimeter (DSC) by the method as described below is equal to or above 190° C. and below 250° C., preferably 200-245° C. and especially 210-240° C.

The detailed method for determining melting point of LCP is as follows:

The differential scanning calorimeter Exstar 6000 (Seiko Instruments Inc., Chiba, Japan) or the same type of DSC device is used. The LCP sample to be examined is heated at the rate of 20° C./minute and endothermic peak (Tm1) is recorded. Thereafter, LCP sample is kept at a temperature 20-50° C. higher than Tm1 for 10 minutes. Then the sample is cooled to room temperature at the rate of 20° C./minute and then, heated again at the same rate. Endothermic peak found in the final step is recorded as melting point.

Preferably, the liquid-crystalline polyester resin used in the present invention is that log viscosity of the same can be measured in pentafluorophenol. The log viscosity of the polymer measured at a concentration of 0.1 g/dl in pentafluorophenol at 60° C. may preferably be 0.3 dl/g or above, more preferably 0.5-10 dl/g, most preferably 1-8 dl/g.

The melting viscosity of the liquid-crystalline polyester resin used in the present invention measured with capillary rheometer may preferably be 1-1000 Pa·s, more preferably 5-300 Pa·s.

The liquid-crystalline polyester resin may be obtained from the polymerizing reaction vessel in molten phase and processed to give pellets, flakes or powders.

The liquid-crystalline polyester resin composition used in the present invention may be those obtained by admixing one or more fibrous, lamellar or particulate filler and/or reinforcement with the liquid-crystalline polyester resin.

Examples of fibrous fillers and/or reinforcements may include glass fiber, silica-alumina fiber, alumina fiber, carbon fiber and aramid fiber. Among them, glass fiber is preferably used because of its good balance of physical properties and cost.

Examples of lamellar or particulate fillers and/or reinforcements may include talc, mica, graphite, wollastonite, calcium carbonate, dolomite, clay, glass flake, glass beads, barium sulfate and titanium oxide.

The fillers and/or reinforcements may be added to the liquid-crystalline polyester resin composition used in the present invention in an amount of 0-100 parts by weight, preferably 10-90 parts by weight per 100 parts by weight of the liquid-crystalline polyester resin. If the amount of the fillers and/or reinforcements is more than 100 parts by weight, the moldability of the resulting liquid-crystalline polyester resin composition tends to be decreased or the exhausting of the cylinder or die of the molding device tends to be increased and further, strength of the joint of LCPs tends to be decreased because of low content of resin in the jointed articles.

The liquid-crystalline polyester resin composition according to the present invention may further be admixed with one or more additives, which are conventionally used for resin compositions, if desired. For example, molding lubricant such as higher aliphatic acid, higher aliphatic ester, higher aliphatic amide, higher aliphatic acid metal salt, polysiloxane and fluorocarbon resin; colorant such as dyes and pigments; antioxidant; thermal stabilizer; UV absorbent; antistatic agent; and surface active agent may be admixed. Molding lubricants such as higher aliphatic acid, higher aliphatic ester, higher aliphatic acid metal salt or fluorocarbon-type surfactant may be added to the pellets of the liquid-crystalline polyester resin or the liquid-crystalline polyester resin composition before subjecting the pellets to the molding process, so that the agent adhere to the outer surface of the pellet.

Preferably, the resin component of the liquid-crystalline polyester resin composition used in the present invention is essentially consisting of liquid-crystalline polyester resin in view of moldability and physical properties. The liquid-crystalline polyester resin composition of the present invention, however, may comprise one or more additional resin component, which has a melting point determined by differential scanning calorimeter of 190-250° C., unless the additional resin component does not impair the object of the present invention. Examples of the additional resin components include thermoplastic resins such as polyamide, polyester, polyphenylene sulfide, polyether ketone, polycarbonate, polyphenylene ether and denatured derivatives thereof, polysulfone, polyethersulfone and polyether imide and thermosetting resins such as phenol resin, epoxy resin and polyimide resin. The amount of the additional resin component is not limited, and may be determined dependent on the intended property. Typically, such additional resins may be added to the liquid-crystalline polyester resin composition in an amount of 0-150 parts by weight, preferably 40-100 parts by weight per 100 parts by weight of the liquid-crystalline polyester resin.

The liquid-crystalline polyester resin composition used in the present invention may be obtained by adding fillers, reinforcements and other resin components to the liquid-crystalline polyester resin and melt kneading the mixture using a kneading machine such as Banbury mixer, kneader, single screw extruder, twin screw extruder or the like.

The liquid-crystalline polyester resin composition may be processed in a conventional manner to give parts to be joined together such as molded article, film, sheet, bonded textile and the like. For example, injection molding or extrusion techniques may preferably used to give parts to be joined.

According to the present invention, the parts made of specific liquid crystalline polyester resin composition are welded. Examples of welding methods suitably employed for the present invention are ultrasonic welding, high-frequency welding, electromagnetic induction welding, impulse welding, vibration welding and spin welding.

Those joining methods (welding methods) are briefly described below.

<Ultrasonic Welding>

In this method, ultrasonic electrical energy is converted into mechanical vibration energy which induces frictional heat at the joint surface of the resin parts to be welded so that they can be welded together.

<High-Frequency Welding>

In this method, dielectric heat is generated inside the parts to be welded by means of high-frequency radiation so that they can be welded together.

<Electromagnetic Induction Welding>

In this method, metal or magnetic material which is placed at the joining portion of the parts to be welded is selectively heated so that the parts are indirectly heated and they can be welded together.

<Impulse Welding>

In this method, the parts are pressurized by means of a pressure pad and then, the nickel chrome wire band mounted at the top of the pressure pad is heated instantaneously to soften or melt the parts so that they can be welded together.

<Vibration Welding>

In this method, both of the parts to be welded are placed under pressure, one of them is vibrated horizontally to induce frictional heat at the welding surface so that the parts can be welded together.

<Spin Welding>

In this method, round shaped molded parts are placed under pressure, the articles are spun at a high speed to induce frictional heat and the parts are welded.

Among the above joining/welding methods, ultrasonic welding, vibration welding or spin welding is especially preferable for the present invention in view of welding properties of large or complex-shaped articles.

In case ultrasonic welding, vibration welding or spin welding is employed, parts are preferably jointed in a manner which provides scurf joint or shear joint.

A scarf joint is formed by joining two members having tapered, beveled, or chamfered ends which lap together. It forms planer contact between the tapered surfaces, those surfaces are uniformly heated and result in ample welding area. Accordingly, scarf joint can provide very high joining strength.

A shear joint is formed by welding a first part having protrusion and a 2nd part having a dent to receive the protrusion, wherein vibration is applied to the edge of the first part and the tapered portion of the 2nd part. In the shear joint, the joining portion is heated with high heat generation efficacy and therefore, strongly welded article can be obtained. In addition, since contacting direction of the parts and the vibrating direction become nearly equal, bubble is hardly formed on welding surface and jointed articles with water-tightness and air-tightness can be obtained.

In the joining method of liquid-crystalline polyester resin composition parts of the present invention, certain parts are jointed by means of welding. That is, the parts to be welded are composed of liquid-crystalline polyester resin composition containing liquid-crystalline polyester resin whose melting point is above or equal to 190° C. and below 250° C. determined by differential scanning calorimeter. According to the method of the present invention, the joining surfaces of the parts are easily molten and therefore, a jointed article of liquid-crystalline polyester resin composition with sufficient joint strength can be manufactured.

In addition, the joining method of the present invention facilitates secondary fabrication of molded articles such as those having thin wall or are fine parts, which can be obtained by using liquid-crystalline polyester resins having excellent moldability. For example, it is possible to manufacture small cross flow fan with thin wall used for indoor equipment of air conditioner or the like by welding small parts with thin wall by means of the present invention.

Moreover, according to the present invention, it is easy to seal films or bonded textiles and therefore, it is possible to produce bag or the like with good air-tightness or chemical resistance.

The present invention is further described in reference to the following Examples.

EXAMPLE

In the examples, following abbreviations are used.

<Monomers Consisting of the Liquid-Crystalline Polyester Resin>

BON6: 6-hydroxy-2-naphthoic acid
POB: para-hydroxybenzoic acid
HQ: hydroquinone
BP: 4,4'-dihydroxybiphenyl
TPA: terephthalic acid
IPA: isophtlialic acid Synthesis Example 1

Synthesis of LCP-I

BON6, POB, HQ and TPA were fed in a reaction container equipped with an agitating device with torque-meter and a condenser in the ratio shown in table 1 so that the total monomer amount was 5 mol. Then potassium acetate 0.05 g (67 mol ppm to the total amount of the monomers) and acetic anhydride 1.025 fold moles to the total amount (moles) of hydroxy groups of the monomers were added to the container. The mixture was polymerized under the following condition.

TABLE 1

Synthesis Example 1: monomer ratio

|   | BON6 | POB | HQ | TPA |
|---|---|---|---|---|
| G | 386 | 297 | 44 | 67 |
| mol % | 41 | 43 | 8 | 8 |

Under the nitrogen atmosphere, the mixture was heated from room temperature to 150° C. over 1 hour and kept at 150° C. for 30 minutes, then rapidly heated to 210° C. with distilling out the by-product acetic acid and kept at the temperature for 30 minutes. Then the mixture was heated to 335° C. over 3 hours and the pressure was reduced to 20 mmHg over 30 minutes. When the torque became the predetermined level, the polymerizing reaction was terminated. The resulting resin was removed from the container and crushed by crusher to give pellets of LCP. As a result, approximately theoretical amount of acetic acid was distilled out.

The melting point of the resulting liquid-crystalline polyester resin determined by DSC was 218° C.

Synthesis Example 2

Synthesis of LCP-II

POB and BON6 were fed in a reaction container equipped with an agitating device with torque-meter and a condenser in the ratio shown in table 2 so that the total monomer amount was 5 mol. Then potassium acetate 0.05 g (67 mol ppm to the total amount of monomers) and acetic anhydride of 1.025 fold moles to the total amount (moles) of hydroxy groups of the monomers were added to the container and polymerizing reaction was performed by the following condition.

TABLE 2

Synthesis Example 2: monomer ratio

|  | POB | BON6 |
|---|---|---|
| g | 504.2 | 254.0 |
| mol % | 73 | 27 |

Under the nitrogen atmosphere, the mixture was heated from room temperature to 150° C. over 1 hour and kept at 150° C. for 30 minutes, then rapidly heated to 210° C. with distilling out the by-product acetic acid and kept at the temperature for 30 minutes. Then the mixture was heated to 325° C. over 3 hours and the pressure was reduced to 20 mmHg over 30 minutes. When the torque became the predetermined level, the polymerizing reaction was terminated. The resulting resin was removed from the container and crushed by crusher to give pellets of LCP. As a result, approximately theoretical amount of acetic acid was distilled out.

The melting point of the resulting liquid-crystalline polyester resin determined by DSC was 280° C.

Synthesis Example 3

Synthesis of LCP-III

POB, BP, TPA and IPA were fed in a reaction container equipped with an agitating device with torque-meter and a condenser in the ratio shown in table 3 so that the total monomer amount was 5 mol. Then potassium acelate 0.05 g (67 mol ppm to the total amount of monomers) and acetic anhydride of 1.025 fold moles to the total amount (moles) of hydroxy groups of monomers were added to the container and polymerizing reaction was performed by the following condition.

TABLE 3

Synthesis Example 3: monomer ratio

|  | POB | BP | TPA | IPA |
|---|---|---|---|---|
| g | 414.4 | 186.2 | 83.1 | 83.1 |
| mol % | 60 | 20 | 10 | 10 |

Under the nitrogen atmosphere, the mixture was heated from room temperature to 150° C. over 1 hour and kept at 150° C. for 30 minutes, then rapidly heated to 210° C. with distilling out the by-product acetic acid and kept at the temperature for 30 minutes. Then the mixture was heated to 350° C. over 3 hours and the pressure was reduced to 20 mmHg over 30 minutes. When the torque became the predetermined level, the polymerizing reaction was terminated. The resulting resin was removed from the container and crushed by crusher to give pellets of LCP. As a result, approximately theoretical amount of acetic acid was distilled out.

The melting point of the resulting liquid-crystalline polyester resin determined by DSC was 330° C.

Examples 1 and 2

Figure 2:
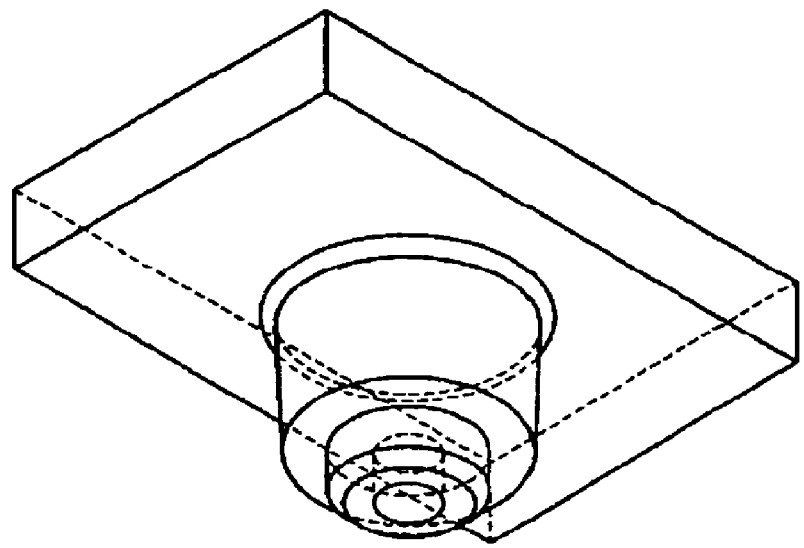
FIG. 2 depicts the shear joint used in Examples.
Figure 2:
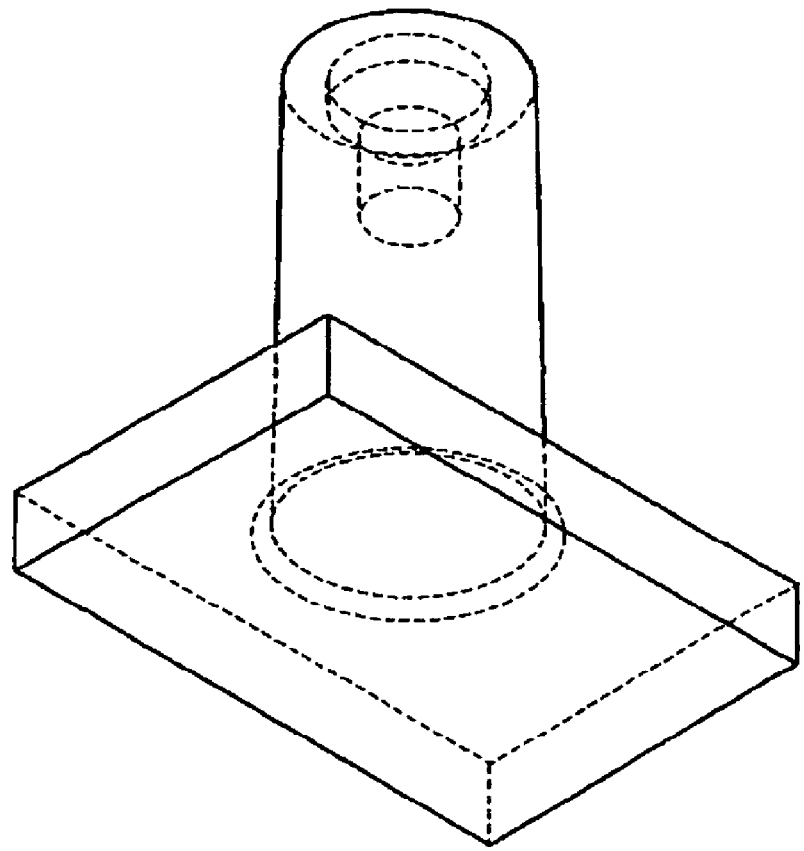

Glass fiber (FT 562, ASAHI FIBER GLASS Co., Tokyo, Japan) (B) or carbon fiber (HTA-C6-S, TOHO TENAX Co. Tokyo, Japan) (C) in an amount shown in table 4 and 100 parts by weight of liquid-crystalline polyester resin, LCP-I (A) were mixed by Henschel mixer and was extruded by Twin-Screw Extruder (TEX 30α, The Japan Steel Works, LTD., Tokyo, Japan) with cylinder temperature of 235° C. to give pellets of the liquid-crystalline polyester resin composition. The resulting pellets were dried at 130° C. for 4 hours and molded by injection molding machine (α-100iA, FANUC LTD, Yamanashi, Japan) with cylinder temperature of 240° C. and die temperature of 70° C. to give parts having the shape suitable for scarf joint shown in FIG. 1 and that suitable for shear joint shown in FIG. 2.

The resulting molded parts were welded to give jointed articles by means of ultrasonic welder (BRANSON 950M, Emerson Japan, Ltd.) under conditions as follows.

The joint strength of the resulting jointed article was evaluated as breaking force at tensile rate of 5 mm/sec in vertical direction to the jointed surface by using Instron Corporation #5567. The result is shown in table 4.

<Ultrasonic Welding Condition>
Vibration: 20 KHz
Horn: conical horn, TIN, ¾ inched diameter
Welding time: 80 msec
Holding Time: 0.5 sec Comparative Examples 1 and 2

A jointed article was prepared by the same procedure as example 1 except that LCP-II was used instead of LCP-I and that injection molding condition with cylinder temperature of 300° C. and die temperature of 70° C. was employed. The evaluation of joint strength was carried out by the same procedure as example 1. The result is shown in table 4.

Comparative Examples 3 and 4

A jointed article was prepared by the same procedure as example 1 except that LCP-III was used instead of LCP-I and that injection molding condition with cylinder temperature of 350° C. and die temperature of 70° C. was employed. The evaluation of joint strength was carried out by the same procedure as example 1. The result is shown in table 4.

TABLE 4

|  | A (resin/ weight parts) | B (weight parts) | C (weight parts) | D (° C.) | E (N) | F (N) |
|---|---|---|---|---|---|---|
| Example 1 | LCP-I/ 100 | 42.8 | 0 | 218 | 330 | 355 |
| Example 2 | LCP-I/ 100 | 0 | 42.8 | 218 | 340 | 370 |
| Comparative Example 1 | LCP-II/ 100 | 42.8 | 0 | 280 | 290 | 245 |
| Comparative Example 2 | LCP-II/ 100 | 0 | 42.8 | 280 | 295 | 270 |
| Comparative Example 3 | LCP-III/ 100 | 42.8 | 0 | 330 | 205 | 195 |
| Comparative Example 4 | LCP-III/ 100 | 0 | 42.8 | 330 | 215 | 200 |

A: Liquid-crystalline polyester resin
B: Glass fiber (ASAHI FIBER GLASS Co., FT 562)
C: Carbon fiber (TOHO TENAX Co, HTA-C6-S)
D: Melting point of liquid-crystalline polyester resin
E: Joint strength of scarf joint
F: Joint strength of shear joint

What is claimed is:

1. A method for joining liquid-crystalline polyester resin composition parts, characterized in that the melting point of the liquid crystalline polyester resin measured by differential scanning calorimeter is 190-250° C., the resin consisting essentially of the repeating units represented by the following formulae (I), (II), (III) and (IV):

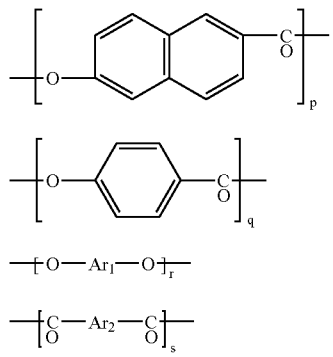

wherein:
Ar$_1$ and Ar$_2$ each represents at least one bivalent aromatic group; and
p, q, r and s represent relative molar proportions (mol %) of the repeating units in the liquid-crystalline polyester resin and satisfy the following formulae:

$0.4 \leq p/g \leq 2.0$ $2 \text{ mol \%} \leq r \leq 15 \text{ mol \%}$ $2 \text{ mol \%} \leq s \leq 15 \text{ mol \%}$, and that the parts are jointed by means of welding.

2. The method according to claim 1, wherein said liquid-crystalline polyester resin consists of the following repeating units:

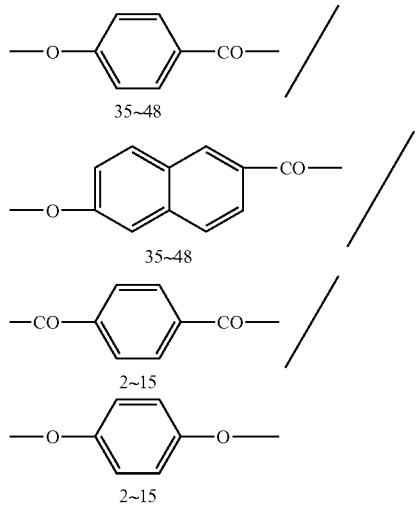

wherein:
the value below the repeating unit represents mol % of each unit in the liquid-crystalline polyester resin.

3. The method according to claim 1, wherein said welding is selected from the group consisting of ultrasonic welding, vibration welding, high-frequency welding, electromagnetic induction welding, impulse welding and spin welding.

4. The method according to claim 1, wherein said welding is ultrasonic welding, vibration welding or spin welding and said liquid-crystalline polyester resin composition parts are welded to form a joint selected from scarf joint and shear joint.

5. The method according to claim 1, wherein the liquid-crystalline polyester resin composition comprises a filler and/or reinforcement in an amount of 0-100 parts by weight per 100 parts by weight of the liquid-crystalline polyester resin.

6. The method according to claim 5, wherein the filler and/or reinforcement is at least one selected from the group consisting of glass fiber, silica-alumina fiber, alumina fiber, carbon fiber, aramid fiber, talc, mica, graphite, wollastonite, calcium carbonate, dolomite, clay, glass flake, glass beads, barium sulfate and titanium oxide.

7. The method according to claim 6, wherein said filler and/or reinforcement is glass fiber.

8. A jointed article made of liquid-crystalline polyester resin composition, which is obtained by joining liquid-crystalline polyester resin composition parts by means of welding, wherein the resin consists essentially of the repeating units represented by the following formulae (I), (II), (III) and (IV):

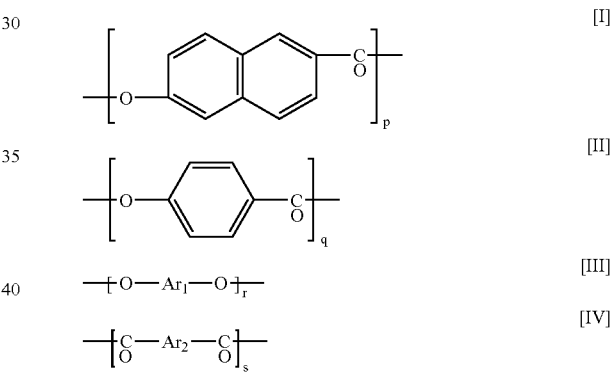

wherein:
Ar$_1$ and Ar$_2$ each represents at least one bivalent aromatic group; and
p, q, r and s represent relative molar proportions (mol %) of the repeating units in the liquid-crystalline polyester resin and satisfy the following formulae:

$0.4 \leq p/q \leq 2.0$ $2 \text{ mol \%} \leq r \leq 15 \text{ mol \%}$ $2 \text{ mol \%} \leq s \leq 5 \text{ mol \%}$, and the melting point of the resin measured by differential scanning calorimeter is 190-250° C.

9. The jointed article according to claim 8, wherein said jointed article is made of parts which are selected from the group consisting of molded article, film, sheet and bonded textile.

10. The jointed article according to claim 8, wherein said liquid-crystalline polyester resin consists of the following repeating units:

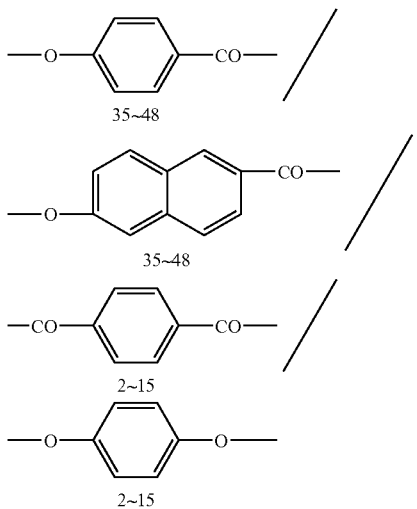

wherein:
the value below the repeating unit represents mol % of each unit in the liquid-crystalline polyester resin.

11. The jointed article according to claim 8, wherein said welding is selected from the group consisting of ultrasonic welding, vibration welding, high-frequency welding, electromagnetic induction welding, impulse welding and spin welding.

12. The jointed article according to claim 8, wherein said welding is ultrasonic welding, vibration welding or spin welding and said liquid-crystalline polyester resin composition parts are welded to form a joint selected from scarf joint and shear joint.

13. The jointed article according to claim 8, wherein the liquid-crystalline polyester resin composition comprises a filler and/or reinforcement in an amount of 0-100 parts by weight per 100 parts by weight of the liquid-crystalline polyester resin.

14. The jointed article according to claim 13, wherein the filler and/or reinforcement is at least one selected from the group consisting of glass fiber, silica-alumina fiber, alumina fiber, carbon fiber, aramid fiber, talc, mica, graphite, wollastonite, calcium carbonate, dolomite, clay, glass flake, glass beads, barium sulfate and titanium oxide.

15. The method according to claim 14, wherein said filler and/or reinforcement is glass fiber.

16. A method for manufacturing a jointed article, which comprises:
providing parts made of liquid crystalline polyester resin composition comprising liquid crystalline polyester resin which consists essentially of the repeating units represented by the following formulae (I), (II), (III) and (IV):

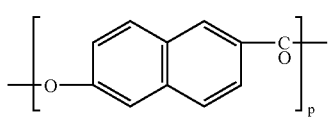

[I]

-continued

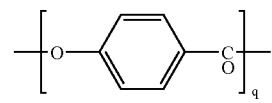

[II]

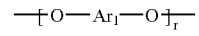

[III]

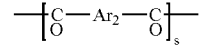

[IV]

wherein:
$Ar_1$ and $Ar_2$ each represents at least one bivalent aromatic group; and
p, q, r and s represent relative molar proportions (mol %) of the repeating units in the liquid-crystalline polyester resin and satisfy the following formulae:

$0.4 \leq p/q \leq 2 0$ $2 \text{ mol }\% \leq r \leq 15 \text{ mol }\%$ $2 \text{ mol }\% \leq s \leq 15 \text{ mol }\%$, and has a melting point measured by differential scanning calorimeter of 190-250° C.; and
joining said parts by means of welding.

17. The method according to claim 16, wherein said liquid-crystalline polyester resin consists of the following repeating units:

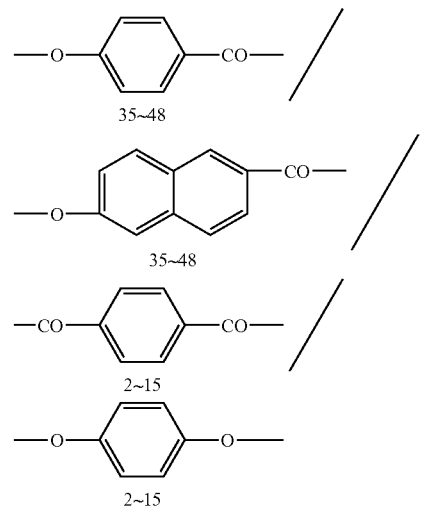

wherein:
the value below the repeating unit represents mol % of each unit in the liquid-crystalline polyester resin.

18. The method according to claim 16, wherein said welding is selected from the group consisting of ultrasonic welding, vibration welding, high-frequency welding, electromagnetic induction welding, impulse welding and spin welding.

19. The method according to claim 16, wherein said welding is ultrasonic welding, vibration welding or spin welding and said liquid-crystalline polyester resin composition parts are welded to form a joint selected from scarf joint and shear joint.

20. The method according to claim 16, wherein the liquid-crystalline polyester resin composition comprises a filler and/or reinforcement in an amount of 0-100 parts by weight per 100 parts by weight of the liquid-crystalline polyester resin.

21. The method according to claim 20, wherein the filler and/or reinforcement is at least one selected from the group consisting of glass fiber, silica-alumina fiber, alumina fiber, carbon fiber, aramid fiber, talc, mica, graphite, wollastonite, calcium carbonate, dolomite, clay, glass flake, glass beads, barium sulfate and titanium oxide.

22. The method according to claim 21, wherein said filler and/or reinforcement is glass fiber.

* * * * *